(12) United States Patent
Tranchero (10) Patent No.: US 11,420,852 B2
(45) Date of Patent: Aug. 23, 2022

(54) CRANE FOR LIFTING AND TRANSPORTING LOADS, EQUIPPED WITH A DRIVE SYSTEM

(71) Applicant: Jacques Tranchero, Costigliole Saluzzo (IT)

(72) Inventor: Jacques Tranchero, Costigliole Saluzzo (IT)

(*) Notice: Subject to any disclaimer, the term of this patent is extended or adjusted under 35 U.S.C. 154(b) by 818 days.

(21) Appl. No.: 16/300,493

(22) PCT Filed: May 11, 2017

(86) PCT No.: PCT/IB2017/052751
§ 371 (c)(1),
(2) Date: Nov. 9, 2018

(87) PCT Pub. No.: WO2017/195140
PCT Pub. Date: Nov. 16, 2017

(65) Prior Publication Data
US 2019/0225464 A1    Jul. 25, 2019

(30) Foreign Application Priority Data
May 12, 2016   (IT) .................. 102016000048549

(51) Int. Cl.
*B66C 23/48* (2006.01)
*B60B 33/04* (2006.01)
(Continued)

(52) U.S. Cl.
CPC .......... *B66C 23/48* (2013.01); *B60B 33/0063* (2013.01); *B60B 33/045* (2013.01);
(Continued)

(58) Field of Classification Search
CPC ......... B66C 23/48; B66C 23/36; B66C 23/88; B66C 23/90; B66C 2700/0378;
(Continued)

(56) References Cited

U.S. PATENT DOCUMENTS 5,188,248 A * 2/1993 Dohnalik ............. B60G 17/005
                                                   212/304
5,639,119 A * 6/1997 Plate ..................... B62D 49/08
                                                   280/754

(Continued)

FOREIGN PATENT DOCUMENTS

EP    2910513 A1    8/2015
FR    2607076 A1    5/1988
(Continued)

OTHER PUBLICATIONS

International Search Report and Written Opinion from International Application No. PCT/IB2017/052751, dated Oct. 10, 2017.

*Primary Examiner* — Tony H Winner
(74) *Attorney, Agent, or Firm* — Merchant & Gould P.C.

(57) ABSTRACT

A crane for lifting and transporting loads includes a handling element, for supporting and handling the loads, and a chassis for transferring the loads of the crane onto a support surface by a contact arranged in contact with the surface, such as wheels. A drive transmission, such as a drive wheel, moves the crane on the support surface. The drive transmission is capable of translating relative to the chassis to adjust the force exerted by the drive transmission upon the support surface. The crane includes a sensor for detecting the force exerted by the drive transmission upon the support surface; and a control unit configured for adjusting the position of the drive transmission relative to the chassis, based on the detection of the sensor.

12 Claims, 5 Drawing Sheets

(51) Int. Cl.
  *B60B 33/00* (2006.01)
  *B66C 23/88* (2006.01)
  *B66C 23/90* (2006.01)
  *B60G 17/027* (2006.01)
  *B60G 17/0165* (2006.01)
  *B62B 5/00* (2006.01)
  *B62B 5/06* (2006.01)

(52) U.S. Cl.
  CPC ....... *B60G 17/0165* (2013.01); *B60G 17/027* (2013.01); *B62B 5/0026* (2013.01); *B62B 5/0069* (2013.01); *B62B 5/0073* (2013.01); *B62B 5/0076* (2013.01); *B62B 5/066* (2013.01); *B66C 23/88* (2013.01); *B66C 23/90* (2013.01); *B60G 2300/06* (2013.01); *B62B 5/0033* (2013.01); *B66C 2700/0378* (2013.01)

(58) Field of Classification Search
  CPC ... B62B 5/0033; B62B 5/0069; B62B 5/0073; A61G 5/1089
  See application file for complete search history.

(56) References Cited

U.S. PATENT DOCUMENTS

| | | | |
|---|---|---|---|
| 7,416,188 B2* | 8/2008 | Segerljung | B60G 21/045 280/124.112 |
| 9,890,024 B2* | 2/2018 | Hao | B60P 1/34 |
| 2006/0232025 A1* | 10/2006 | Braud | B66F 9/07586 280/5.508 |
| 2017/0050643 A1* | 2/2017 | Lambert | B60P 1/045 |

FOREIGN PATENT DOCUMENTS

| | | | |
|---|---|---|---|
| FR | 2725437 | * | 4/1996 |
| FR | 2725437 A1 | | 4/1996 |
| GB | 2293148 A | | 3/1996 |
| WO | 2012/096570 A1 | | 7/2012 |
| WO | 2014/187864 A1 | | 11/2014 |

* cited by examiner

CRANE FOR LIFTING AND TRANSPORTING LOADS, EQUIPPED WITH A DRIVE SYSTEM

This application is a National Stage Application of International Application No. PCT/IB2017/052751, filed 11 May 2017, which claims benefit of Ser. No. 102016000048549, filed 12 May 2016 in Italy and which applications are incorporated herein by reference. To the extent appropriate, a claim of priority is made to each of the above disclosed applications.

TECHNICAL FIELD

The present invention relates to a crane for lifting and transporting loads, such as, for example, industrial material.

BACKGROUND ART

In the industrial field, as well as in the craftsmen's world, it is known that loads, even heavy ones, sometimes need to be picked up, handled and positioned high and far from the pick-up point. Now and then the cranes need to move on irregular or bumpy support surfaces, so that it may happen that the ground contact means, which generally consist of wheels, lose contact with the ground. In fact, the cranes known in the art are equipped with wheels rigidly constrained to the chassis, which therefore cannot properly adapt themselves to the roughness of the ground, e.g. depressions or bumps. This situation becomes particularly unfavourable when a drive wheel loses contact with the ground, thus making it difficult or even impossible for the machine to move normally on the ground. In particular, this problem becomes even worse with cranes equipped with just one drive wheel.

SUMMARY OF THE INVENTION

It is one object of the present invention to provide a crane for lifting and transporting loads which can overcome this and other drawbacks of the prior art, while at the same time being simple and economical to manufacture.

In particular, one of the technical problems solved by the present invention is to improve crane traction on all kinds of surfaces, particularly allowing the crane to move also on bumpy and irregular support surfaces.

According to the present invention, this and other objects are achieved through a crane.

It is to be understood that the appended claims are an integral part of the technical teachings provided in the following detailed description of the invention. In particular, the appended dependent claims define some preferred embodiments of the present invention, which include some optional technical features.

BRIEF DESCRIPTION OF THE DRAWINGS

Further features and advantages of the present invention will become apparent from the following detailed description, which is supplied by way of non-limiting example with particular reference to the annexed drawings, wherein.

DETAILED DESCRIPTION OF THE INVENTION

Figure 1:
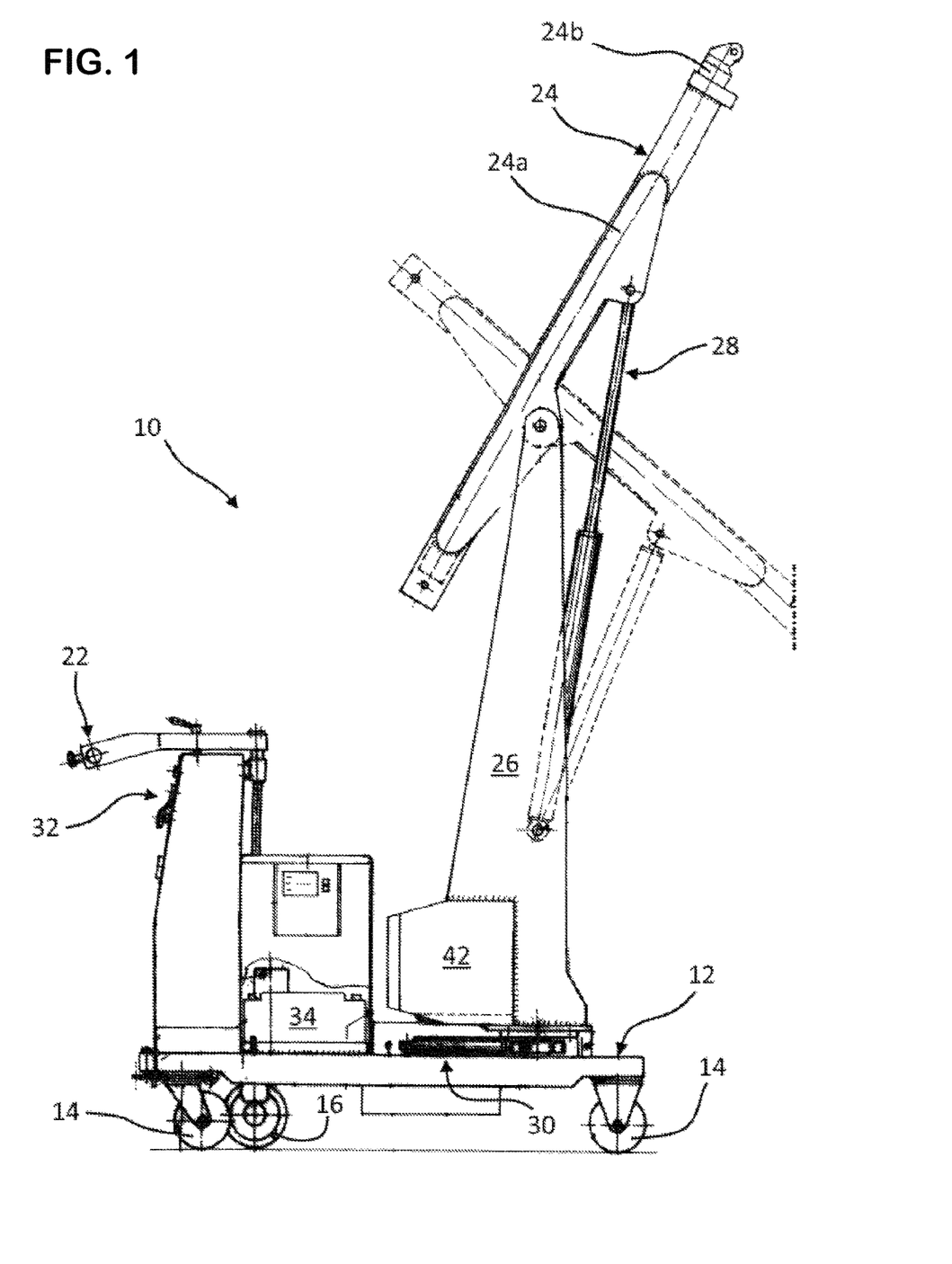
FIG. 1 is a side view of a crane according to the invention.
Figure 2:
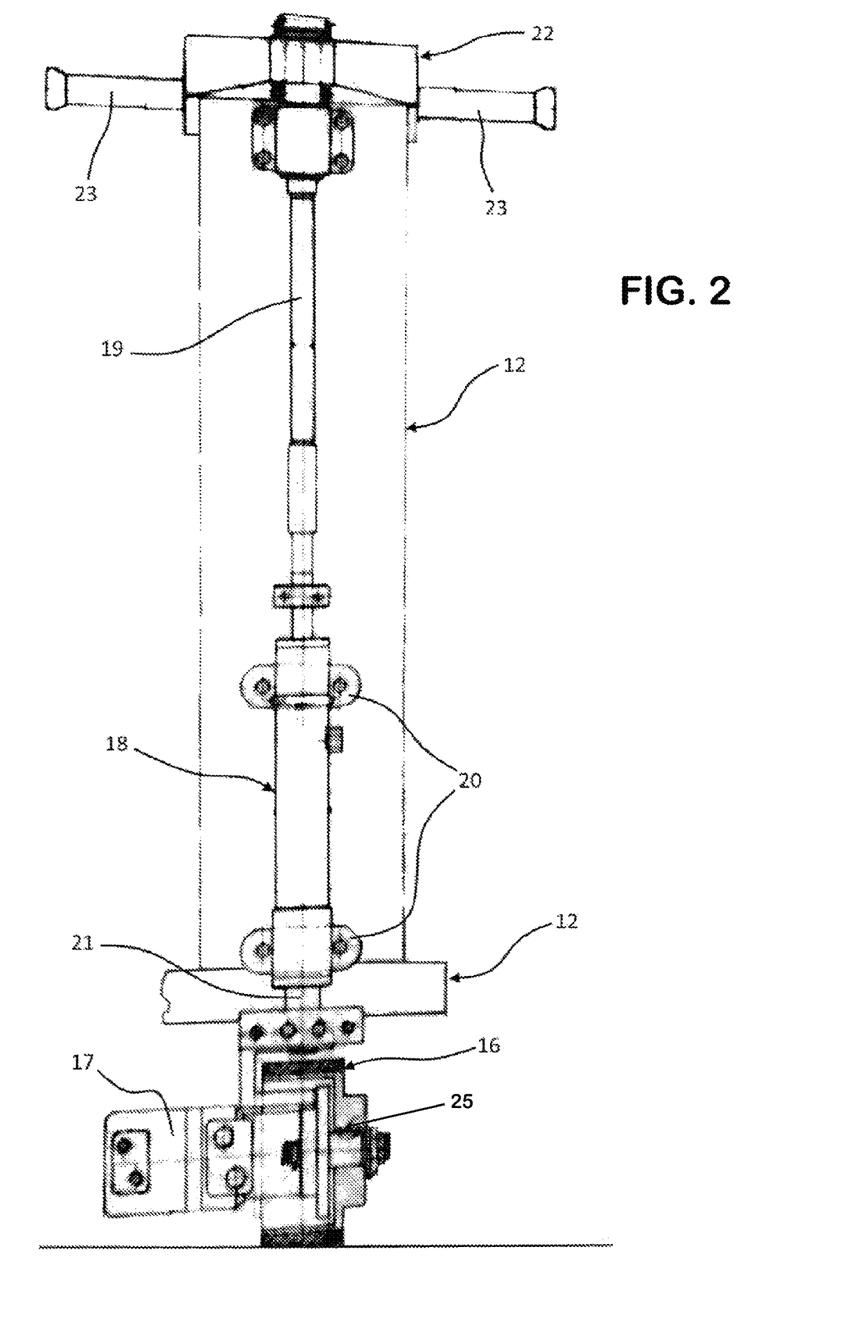
FIGS. 2 and 3 are, respectively, a front view and a side view of some details of the drive transmission means according to the invention.
Figure 3:
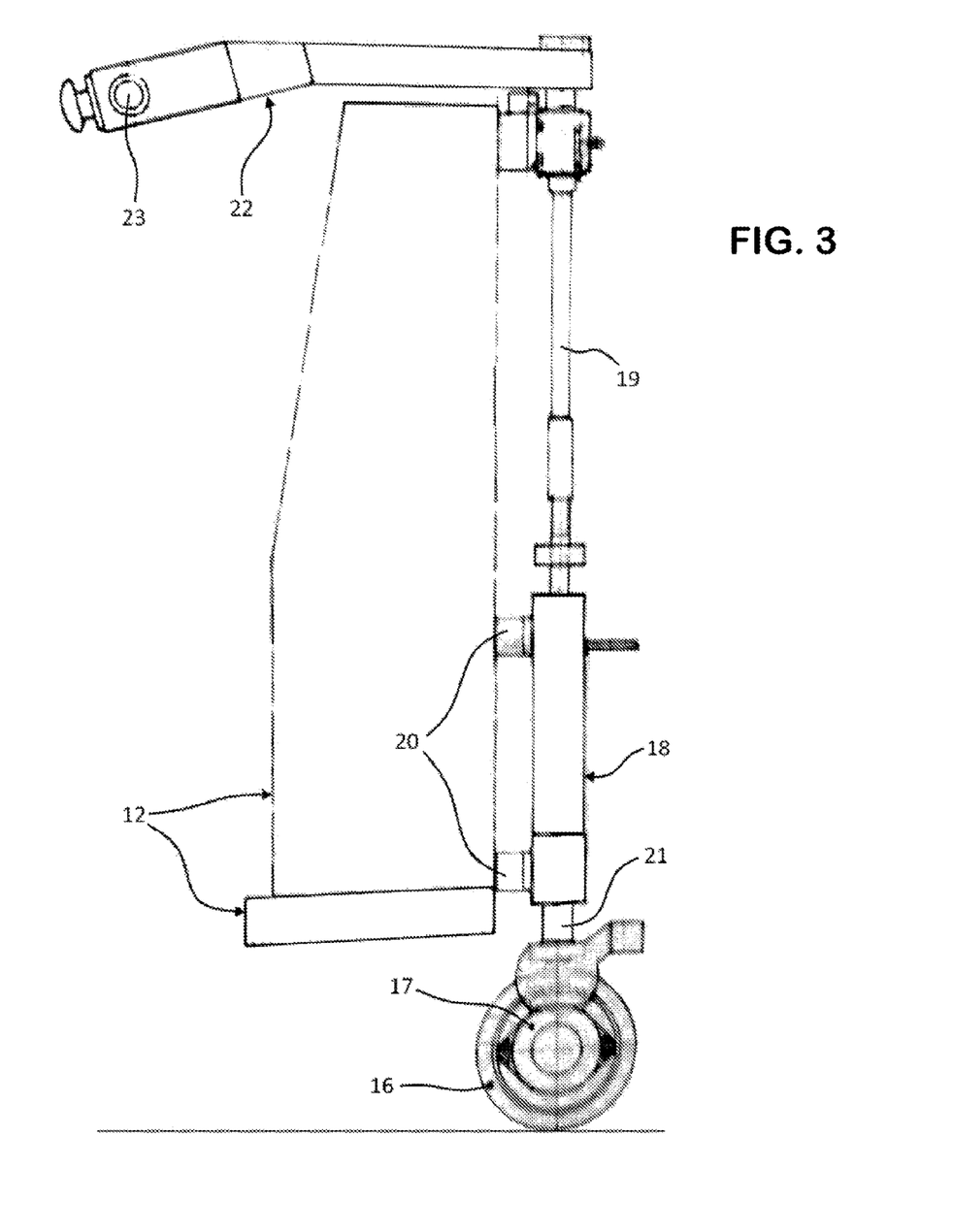

With particular reference to FIG. 1, numeral 10 designates as a whole a crane for lifting and transporting loads, which comprises:
 a handling element, for supporting and handling the loads;
 a chassis 12, for transferring the loads of the crane 10 onto a support surface by means of contact means 14 arranged in contact with said surface, such as wheels;
 a drive transmission means 16, such as a drive wheel, for moving the crane 10 on the support surface.

The drive transmission means 16 is capable of translating relative to the chassis 12, thus lowering and lifting itself, to adjust the force exerted by said drive transmission means 16 upon the support surface.

The crane 10 further comprises:
 a sensor 25 for detecting the force exerted by said drive transmission means 16 upon the support surface;
 a control unit 100 configured for adjusting the position of said drive transmission means 16 relative to said chassis 12, based on the detection of said sensor 25.

Preferably, the drive transmission means 16 can rotate so as to allow the crane 10 to be steered, in particular about a substantially vertical axis of rotation, or steering axis.

Preferably, the drive transmission means 16 is capable of translating along a direction that is substantially orthogonal to a flat support surface. For example, when the crane 10 is resting on a horizontal flat surface, the drive transmission means 16 can translate vertically.

Preferably, the contact means 14 in contact with the support surface are wheels; alternatively, other per se known elements can be used, such as tracks. Preferably, the drive transmission means 16 is a drive wheel, as shown in the illustrated example; alternatively, other per se known elements can be used, such as tracks. For the purposes of the present description, reference will be made herein to a "wheel" or "drive wheel" without however limiting the scope of the invention to such components, which constitute a preferred variant thereof. Moreover, as will be apparent to those skilled in the art, the terms "support surface", "ground", "soil" will be used herein by way of example as equivalent terms useful for understanding the invention, without however limiting the scope of the latter.

Optionally, the drive transmission means 16 comprises a pair of drive wheels, which can conveniently rotate independently of each other. Such a solution turns out to be advantageous for steering, since the presence of a pair of drive wheels, as opposed to a single drive wheel, allows reducing the friction force between the drive wheels and the ground, which hinders the steering action.

The drive transmission means 16, in particular the drive wheel, is coupled to a respective motor 17 outputting mechanical power in order to turn said drive transmission means 16, thereby allowing the crane 10 to move on the ground. Conveniently, the motor 17 is a self-braking unit. When the user stops actuating the "forward" control of the crane 1, said motor 17 generates a braking action in order to stop the motion of the crane 10 relative to the ground as soon as possible. The motor 17 may be of a per se known type, including a hydraulic or electric motor.

When the crane 10 is moving on the support surface, if the drive wheel encounters a depression or a bump, the contact forces exchanged between said drive wheel and the ground will change instantaneously; in the case of a depression, such contact forces will typically be reduced or even cancelled. In such a situation, the sensor 25 will detect the change, and the drive wheel will be moved relative to the chassis 12 to bring the contact forces back to a predetermined value, for the purpose of restoring the friction forces between the drive wheel and the ground. In this manner, the drive wheel will be able to exert on the support surface the driving force necessary for causing the crane to move forward.

Therefore, the drive transmission means 16 can take a projecting and lowered position relative to the contact means 14. In other words, with reference with the illustrated example, the drive transmission means 16 can translate in a guided manner, thereby moving up and down relative to the chassis 12, for the purpose of adapting itself to the unevenness of the ground, thus ensuring better traction. In one possible variant of the invention, the drive transmission means 16 can take a projecting and lowered position relative to the contact means 14 and a position substantially aligned with the contact means 14. According to a further variant of the invention, the drive transmission means 16 can take a projecting and lowered position relative to the contact means 14 and a retracted and raised position relative to the contact means 14. This latter variant allows, for example, adapting the drive wheel also to protrusions of the ground, thus ensuring optimum traction and allowing the crane to move forward. In general, the drive transmission means 16 can translate relative to the chassis 12, moving up and down to adjust the force exchanged with the support surface.

With reference to the preferred variant illustrated in the drawings, the plan projection of the contact means 14 in contact with the support surface defines a polygon, and the drive transmission means 16 is arranged within said polygon. In particular, the crane 10 comprises four wheels so arranged as to form a rectangle in a plan view, and the drive wheel is located within said rectangle. As an alternative, the drive transmission means 16 is external to the above-defined polygon.

Preferably, the crane 10 comprises a linear actuator for moving the drive transmission means 16 so as to lower and lift it relative to the chassis 12, conveniently along a straight trajectory. Said linear actuator 18, which conveniently is a hydraulic jack, causes the drive wheel to translate along a substantially vertical direction. The control unit 100 controls the operation of the linear actuator 18. The sensor 25, which may be a per se known unit, can detect the force exerted by the linear actuator 18, in particular by the hydraulic jack.

With particular reference to the illustrated example, the linear actuator 18, in particular the hydraulic jack, is rotatably mounted to the chassis 12, e.g. by means of brackets 20 fastened to the chassis 12. The linear actuator 18 is rotatably constrained to the drive transmission means about the steering axis, which is, in particular, vertical.

Preferably, the crane 10 comprises a directional drawbar 22 for controlling the steering of said drive transmission means 16. The drawbar 22 is conveniently equipped with a pair of grips 23 for easier control. The drawbar 22 may be a servo-assisted unit. Steering servo-assistance can be provided in a per se known manner, and is useful to reduce the force that a user must exert in order to steer the drive wheel by means of the drawbar 22, thus leading to improved comfort and ease of use of the crane, particularly when the weight of the crane and of the load carried by it is heavy, in which case the friction between the drive wheel and the ground will make manual steering by a user difficult. By way of example, a steering linear actuator may be used, e.g. a hydraulic jack, in order to make steering easier.

The linear actuator 18, in particular the hydraulic jack, includes a shaft 19 constrained to the drawbar 22, and a telescopic rod 21 constrained to the drive transmission means 16 about the steering axis and along the lowering and lifting direction of motion. The telescopic rod 21 can slide, particularly along a vertical axis, thereby lowering and lifting the drive transmission means 16 relative to the chassis 12. By turning the drawbar 22, the user will therefore turn the shaft 19 and the telescopic rod 21, thereby controlling the steering of the drive transmission means 16.

According to further embodiments, other actuation mechanisms can be employed for moving the drive transmission means 16 relative to the chassis 12, e.g. a lever system or gears.

Advantageously, return means 74 is included, preferably an elastic means such as, for example, a spring, which tends to push the drive transmission means 16 towards the lowered position, i.e. towards the support surface. It is thus possible to ensure a minimum contact force between said drive transmission means 16 and the support surface. For example, the elastic means is associated with the linear actuator 18 and acts upon the telescopic rod 21.

With reference to the illustrated variants, the handling element comprises an arm 24, in particular a telescopic arm; in the example, two mutually sliding segments 24a, 24b are controlled by a respective linear actuator, e.g. a hydraulic jack. In FIG. 1, the telescopic arm 24 is in a retracted condition. As an alternative, the telescopic arm 24 may be made up of more than two sliding segments.

Preferably, the arm 24 is equipped with per se known means for hooking and transporting loads, such as, for example, grabs, claws, a hook, or a platform, etc. Optionally, a winch system or a windlass is associated with the arm 24 for load handling. Said winch is conveniently actuated by a motor means, such as an electric motor. With the winch (or windlass) a hook or the like can be associated, which can be extracted or retracted by the winch itself. According to further variants, it is only possible to associate one or more hooks with the arm.

The arm is hinged to a turret 26 associated with the chassis 12. Between the turret and the arm, a second linear actuator 28 is connected for moving the arm 24 relative to the turret 26. In particular, the arm 24 can be rotated in a substantially vertical plane. In FIG. 1, a dashed line shows the arm 24 in a different position.

Preferably, the turret 26 is rotatable relative to the chassis 12, in particular about a substantially vertical axis. In this way, loads can be handled and picked up three-dimensionally, without necessarily having to move the crane on the support surface.

With particular reference to the illustrated example, the turret 26 is rotated by a third linear actuator 30 constrained to the chassis 12. Said third linear actuator 30 is hinged to a rotary member, such as a pinion, having a plurality of teeth on at least a part of its contour to mechanically engage with a base portion of the turret 26, which is also provided with teeth. As an alternative, the third linear actuator 30 may be hinged directly to a base portion of the turret 26 in order to rotate it.

Preferably, the drawbar 22 is equipped with a plurality of controls for controlling the motion of the crane 10 and the movements of the handling element. Such controls, or just some of them, may also be arranged in other positions on the crane 10, e.g. on a control panel 32 or a part of the chassis 12. Through these controls, the intervention of the first 18 and second linear actuator 28 can be controlled. These controls may also provide control over the means for load hooking and transportation, such as the extractable hook, etc.

The controls may include, for example, push-buttons, levers, displays, warning lamps, sirens, and various indicators, so that miscellaneous signals concerning the operation of the crane 10 can be received.

According to a preferred embodiment of the present invention, the crane 10 comprises a wireless remote control system 76 for controlling the drive transmission means 16 and for moving the crane 10 on the support surface. This system controls the mechanical power output of the drive wheel and the steering thereof. Preferably, the remote control system 76 also controls the activity of the handling element. Conveniently, the drawbar 22 and the remote control system 76 can send the same commands to the crane 10 and may also be able to provide the same signaling to the user; the user will thus be free to control the crane 10 either via the directional drawbar 22 or via the remote control system 76. Thanks to the presence of the remote control system 76, a user can work remotely, remaining at a distance from the crane as it is moving on the support ground and during the load handling operations. Safety is thus improved, due to the fact that the user is no longer compelled to remain constantly in contact with the crane, in particular when it is necessary to work in dangerous conditions, such as, for example, unsafe environments where heavy masses are likely to fall, presence of very hot objects, presence of harmful substances, etc.

The crane 10 preferably comprises at least one electric battery 34, which may be either a rechargeable or non-rechargeable unit. Conveniently, the battery is a rechargeable battery and can be recharged by suitable battery recharging means without needing removal from the crane 10, e.g. by connecting the recharging means to an industrial or domestic power outlet. In particular, the battery can supply energy to at least one of: one or more linear actuators 18, 28; signaling devices (if present); the control system; the drive transmission means 16; etc.

For brevity's sake, as aforementioned, reference will now be made to a drive wheel, but the generalization of the drive transmission means 16 will still remain valid.

The control unit 100 is configured on the basis of predetermined criteria or according to criteria that can be pre-defined at will by the user, in particular as concerns the translation of the drive wheel for ground traction adjustment (lowering/lifting movement). During the normal use of the crane, the user cannot decide to lift/lower the drive wheel to change the contact force exchanged between it and the ground, since this movement will be decided by the control unit 100 according to predetermined criteria in co-operation with the sensor 25.

According to a variant of the invention, the contact force between the drive wheel (more in general, the drive transmission means 16) and the ground is intended to remain within a predefined range; if said contact force falls outside said range, the control unit 100 will move the drive wheel so as to cause the contact force to return within the predefined range.

In accordance with a further variant of the invention, the predefined range may vary as a function of a number of parameters. Such parameters preferably include at least one of: the total weight of the crane; the slope of the support surface whereon the crane rests; the roll-over torque acting upon the crane; the ratio between roll-over torque and stabilizing torque; the type and/or speed of the movement being carried out by the handling element; the speed and/or acceleration required from the drive wheel in order to move the crane on the support surface; detection of a loss of traction between the drive wheel and the support surface. In this manner it is possible to further improve the traction of the drive wheel by adjusting the force exchanged between the latter and the ground in accordance with the different operating conditions that may be encountered, thereby reducing the risk that the drive wheel might slip on the ground.

Figure 4:
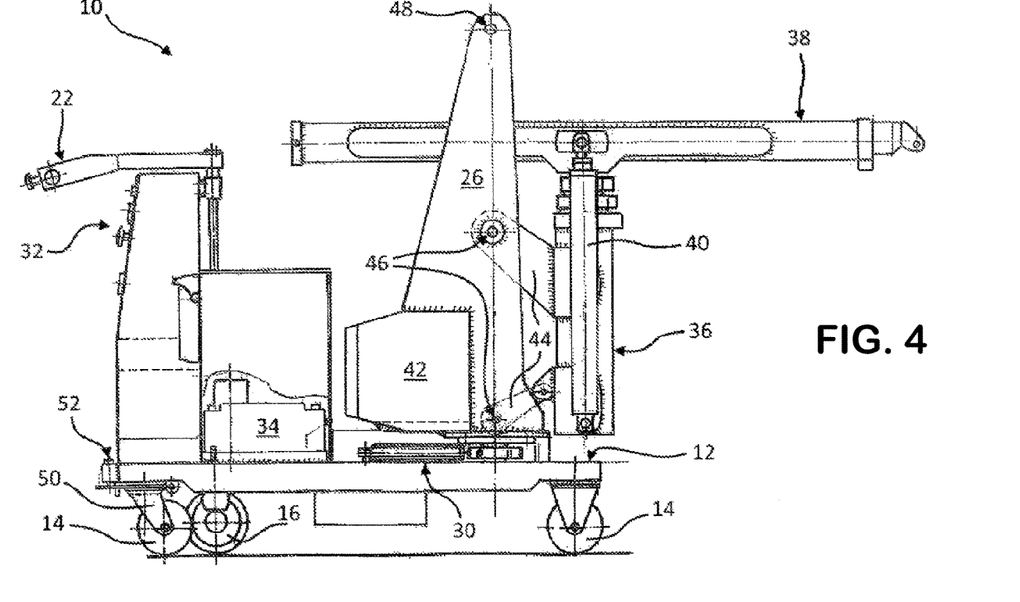
FIG. 4 is a side view of a crane in accordance with a second embodiment of the present invention.

FIG. 4 shows a crane 10 in accordance with a further embodiment, wherein a telescopic column 36, in particular a vertical one, is constrained to the turret 26, at the top of which column a horizontal arm 38, in particular a telescopic one, is connected. The crane also includes a vertical linear actuator 40 for extending and retracting the telescopic column 36, in order to lift and lower the horizontal arm 38. In particular, one end of the vertical linear actuator 40 is fixed to the horizontal arm 38. Conveniently, two vertical linear actuators 40 are employed, in particular of the three-segment type, which are arranged at the sides of the telescopic column 36. It will thus be possible to carry out depthwise telescopic operations with loads very close to the ground.

The telescopic column 36 is removably mounted to the turret 26, in particular through brackets 44. The brackets are removably fastened to the turret 26 via through holes 46 provided on the turret 26, which are preferably intended to house respective through pins. As an alternative, the through holes 46 are adapted to receive bolts, which may be used for fastening the brackets 44. The top end of the turret 26 has an additional through hole 48 to allow removable installation of the arm 24 shown in FIG. 1, wherein said arm 24 is hinged to the turret 26.

Therefore, in general, the turret 26 comprises, at a top end thereof, a through hole 48 to allow hinging the arm 24, and further comprises removable fastening means for removably attaching the telescopic column 36 to the turret 26. It will thus be advantageously possible to change the handling element associated with the turret 26, switching from the variant shown in FIG. 1 to the one shown in FIG. 4, while still using the same turret 26. Preferably, the turret 26 can turn relative to the chassis 12, in particular about a substantially vertical axis.

With reference to the variants illustrated in FIGS. 1 and 4, at the base of the turret 26 there is a counterweight 42, which is so arranged as to counterbalance the roll-over torque generated by a load carried by the handling element. The counterweight 42 and the arm 24 or 38 are arranged in a position opposite to the turret 26.

In accordance with a preferred variant of the invention, an elastic safety means 52 is interposed between at least one contact means 14 and the chassis 12, so as to enable a relative movement between said contact means 14 and the chassis 12. With reference to FIG. 4, the contact means 14 (which in the example is a wheel) is constrained to a support 50 hinged to the chassis 12, between which the elastic safety means 52 is interposed, which may be a spring operating either in compression or in traction. When the contact means 14 and the chassis 12 assume a threshold position, predetermined functions of the crane 10 are carried out so as to prevent it from rolling over, conveniently through the intervention of the control unit 100 or a control system. For example, movements that cause an increased roll-over torque in the crane 10 may be prevented; or one or more movements of the crane 10 may be carried out, which can lead to a reduced roll-over torque. A sensor means, such as a contact sensor or a proximity sensor, is used in order to detect the mutual position between the contact means 14 and the chassis 12. Optionally, signaling means signal the achievement of the threshold condition; such signaling means may be per se known, e.g. audible and/or visual signaling means.

In FIG. 4, the ground contact means 14 comprise four wheels, two of which are movably constrained to the chassis 12 through interposition of the elastic safety means 52. In the example, the two wheels associated with the elastic safety means 52 are those which are farthest from the handling element, in particular from the horizontal arm 38. Of course, the elastic safety means 52 is also applicable to the variant of FIG. 1.

When the roll-over torque increases (e.g. because of an extension of the telescopic arm 24 or 38 from which the loads are suspended), the constraint reaction at the contact means 14 will change. When the roll-over torque reaches a threshold or dangerous value, the contact means 14, equipped with the respective elastic safety means 52, will take a corresponding threshold position relative to the chassis 12; at this point, the anti-roll-over safety system will come on to inhibit any dangerous increase in roll-over torque.

In general, when the mutual position between the contact means 14 and the chassis 12 reaches the threshold position, the control system can be programmed to carry out numerous different predetermined functions, which may include, for example: stopping one or more linear actuators 18, 28, 30, 40; causing at least one linear actuator to execute one or more predefined movements; stopping the operation of the drive transmission means 16; emitting an emergency signal perceivable by a user (e.g. an audible and/or luminous signal), etc.

Figure 5:
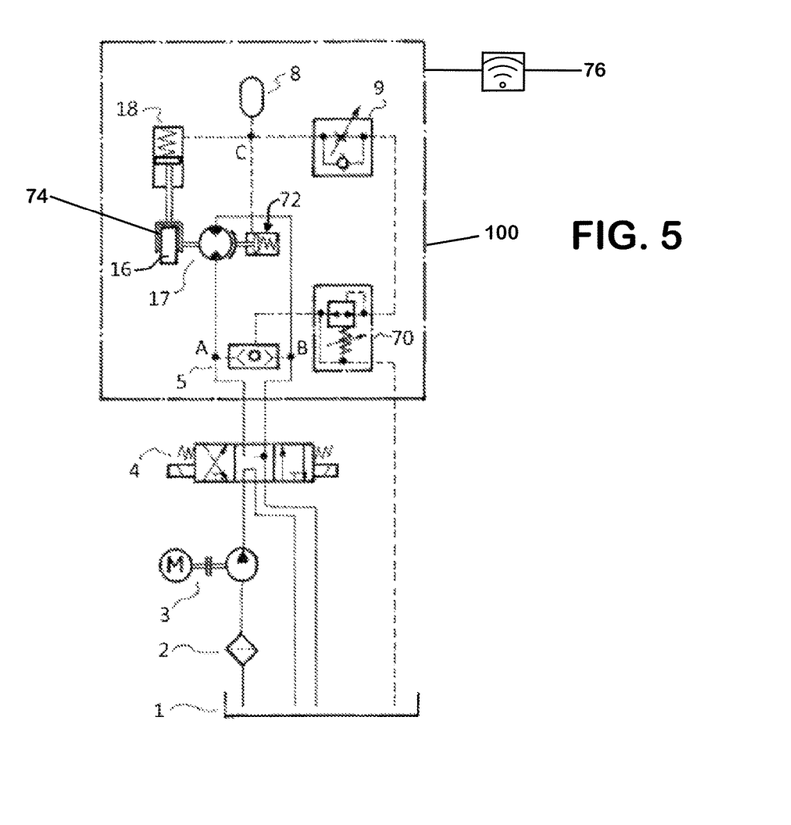
FIG. 5 is a circuit diagram in accordance with a particular embodiment of the present invention.
Figure 6:
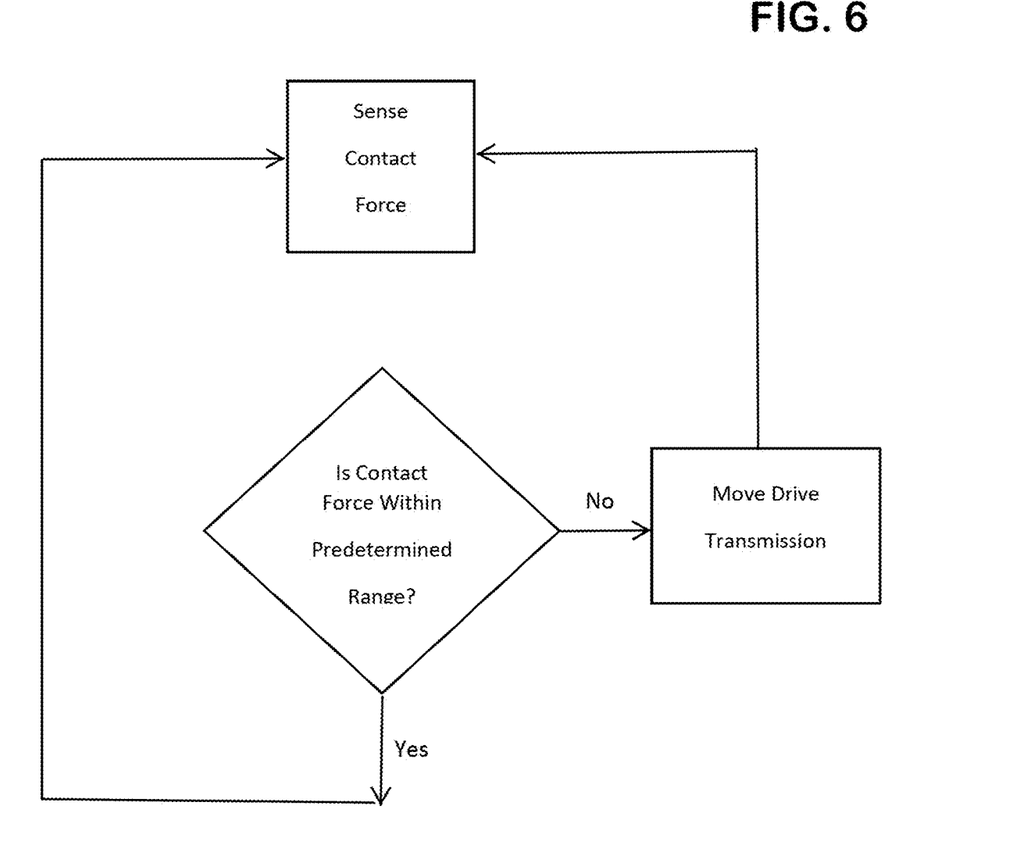
FIG. 6 is a flow chart showing the sensing of contact forces and adjustment of the drive transmission.

FIG. 5 shows a circuit diagram 100 that can preferably be used in order to control the operation of the drive transmission means 16, which can also generate, in addition to motive power, a braking force for stopping the motion of the crane on the ground. The diagram refers to the variant wherein the motor 17 is a hydraulic motor. A pump 3, preferably a fluid dynamic pump, in particular and electric pump, takes hydraulic fluid, preferably oil, from a tank 1 and pushes it through a distributor 4, in particular of the 4/3 type. The distributor 4 is useful to control the direction of actuation of the motor 17, thereby determining the forward or backward motion of the drive transmission means 16; for example, the distributor 4 can be switched to determine the clockwise or counterclockwise rotation of the drive wheel. A fluid filter 2 is conveniently arranged between the tank 1 and the pump 3, in particular along the fluid output or delivery duct. From the distributor 4, the fluid flows from/to the motor 17 through a delivery duct and a return duct, between which a flip-flop valve 5 is arranged in parallel (see nodes A and B). Conveniently, a hydraulic accumulator 8 (in particular an oleo-dynamic or oleo-pneumatic accumulator) is connected to the motor 17. The linear actuator 18, which in this case is a hydraulic jack, acts upon the drive transmission means 16 to lift or lower it. The hydraulic accumulator 8 is also connected to the linear actuator 18. Node C connects the drain lines (dashed line) coming from the linear actuator 18, the motor and the hydraulic accumulator 8. A one-way flow regulator 9 is connected in series to node C. A pressure reducing valve 70 is connected in series to the one-way flow regulator 9, which valve has a duct connected to the flip-flop valve 5 and a vent duct directed towards the tank 1.

The motor 17 comprises a braking unit 72 for exerting a braking action upon the drive transmission means 16 when said motor 17 is not exerting motive power upon said drive transmission means 16. When the pump 3 is not active, a braking force acts upon the drive transmission means 16. It is thus possible to cause the crane to decelerate or to hold it stationary on the ground. For example, return means 74, e.g. an elastic means, tends to exert the braking action upon the drive transmission means 16 and, when the pump 3 activates the hydraulic circuit, the fluid pressure will overcome the resistance of said return means 74, thus putting in motion the drive transmission means 16.

When the drive transmission means 16 is in operation, the flip-flop valve 5 detects a pressure difference at the inlet nodes A and B, and the fluid at higher pressure flows at least partly towards the pressure reducing valve 70, the pressure output or pilot range of which will then charge the hydraulic accumulator (in particular, the oleo-pneumatic accumulator) 8 while simultaneously generating additional pressure in the linear actuator 18. This pressure, adding up to the existing pressure generated by the return means 74, will create an automatic floating braking system (thus generating a torque) capable of adapting itself to different conditions in terms of ground, load, speed, etc.

Advantageously, this circuit system also ensures an extremely smooth braking effect, avoiding any sudden actions that might damage the crane.

Of course, without prejudice to the principle of the invention, the forms of embodiment and the implementation details may be extensively varied from those described and illustrated herein by way of non-limiting example, without however departing from the scope of the invention as set out in the appended claims.

The invention claimed is:

1. A crane for lifting and transporting loads, comprising:
a handling element, for supporting and handling the loads;
a chassis, for transferring the loads of the crane onto a support surface by a contact arranged in contact with said surface; said chassis being constrained, in a movable manner, to said handling element;
a drive transmission for moving the crane on the support surface; wherein said drive transmission is translatable relative to said chassis, lowering and lifting said drive transmission, to adjust force exerted by said drive transmission upon the support surface;
a sensor for detecting the force exerted by said drive transmission upon the support surface;
a control unit configured for adjusting a position of said drive transmission relative to said chassis, based on the detection of said sensor.

2. The crane according to claim 1, wherein said drive transmission is rotatable to allow the crane to be steered.

3. The crane according to claim 2, wherein said drive transmission is translatable along a direction that is substantially orthogonal to a flat support surface.

4. The crane according to claim 2, comprising a directional drawbar for controlling steering of said drive transmission.

5. The crane according to claim 4, comprising a wireless remote control system for controlling said drive transmission to move the crane on the support surface.

6. The crane according to claim 1, wherein a plan projection of said contact with the support surface defines a polygon, and said drive transmission is arranged within said polygon.

7. The crane according to claim 1, comprising a linear actuator for moving said drive transmission to lower and lift said drive transmission relative to said chassis.

8. The crane according to claim 1, comprising a return.

9. The crane according to claim 1, wherein an elastic safety element is interposed between the contact and said chassis.

10. A crane for lifting and transporting loads, comprising:
a handling element, for supporting and handling the loads;
a chassis, for transferring the loads of the crane onto a support surface by a contact arranged in contact with said surface; said chassis being constrained, in a movable manner, to said handling element;
a drive transmission for moving the crane on the support surface; wherein said drive transmission is translatable relative to said chassis, lowering and lifting said drive transmission, to adjust force exerted by said drive transmission upon the support surface;
a sensor for detecting the force exerted by said drive transmission upon the support surface;
a control unit configured for adjusting a position of said drive transmission relative to said chassis, based on the detection of said sensor;
wherein a contact force generated by the contact between said drive transmission and the support surface is adapted to remain within a predefined range; if said contact force differs from said range, said control unit moves said drive transmission to cause the contact force to return within the predefined range.

11. The crane according to claim 10, wherein said predefined range varies as a function of plurality of parameters.

12. The crane according to claim 11, wherein the parameters include at least one of:
a total weight of the crane; a slope of the support surface whereon the crane rests;
a roll-over torque acting upon the crane;
a ratio between the roll-over torque and stabilizing torque;
a speed of movement by the handling element;
a speed and/or an acceleration required from the drive transmission to move the crane on the support surface;
a detection of a loss of traction between the drive transmission and the support surface.

* * * * *